Aug. 13, 1940.  C. J. KLEIN ET AL  2,211,472
REEL STRUCTURE
Filed March 2, 1938    6 Sheets-Sheet 1
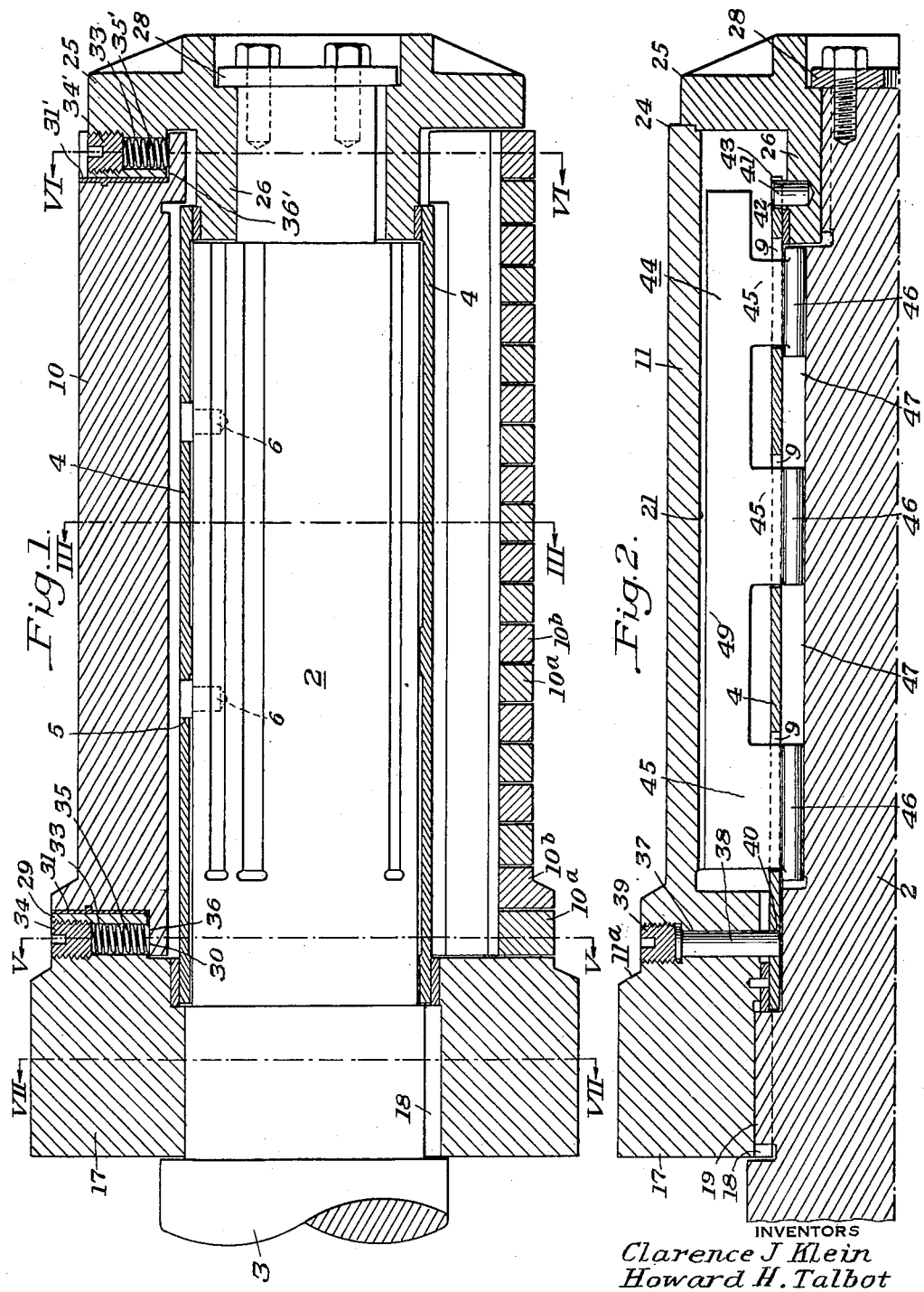
INVENTORS
Clarence J. Klein
Howard H. Talbot
by Stebbins, Blenko & Parmelee
Their Attys.

Aug. 13, 1940.　　　C. J. KLEIN ET AL　　　2,211,472
REEL STRUCTURE
Filed March 2, 1938　　　6 Sheets-Sheet 2
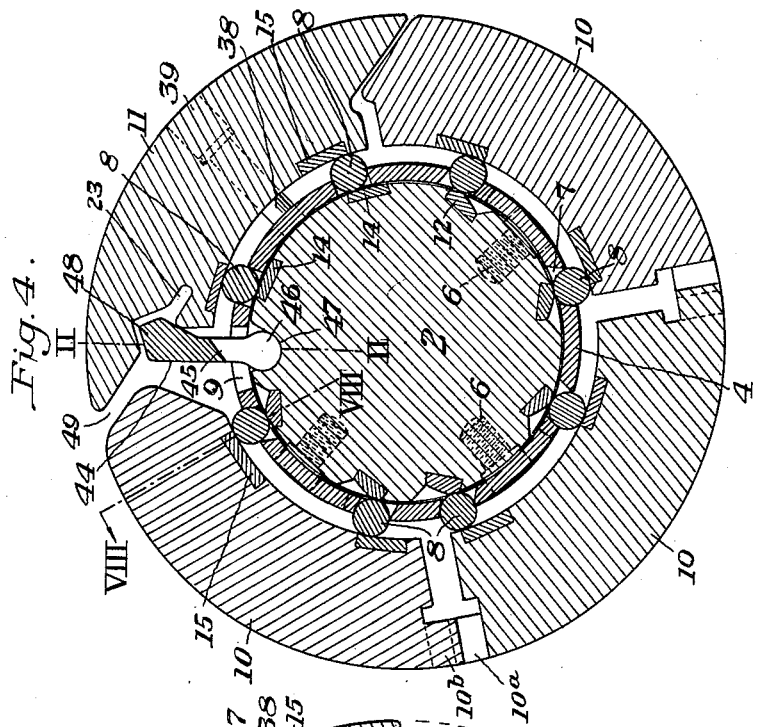
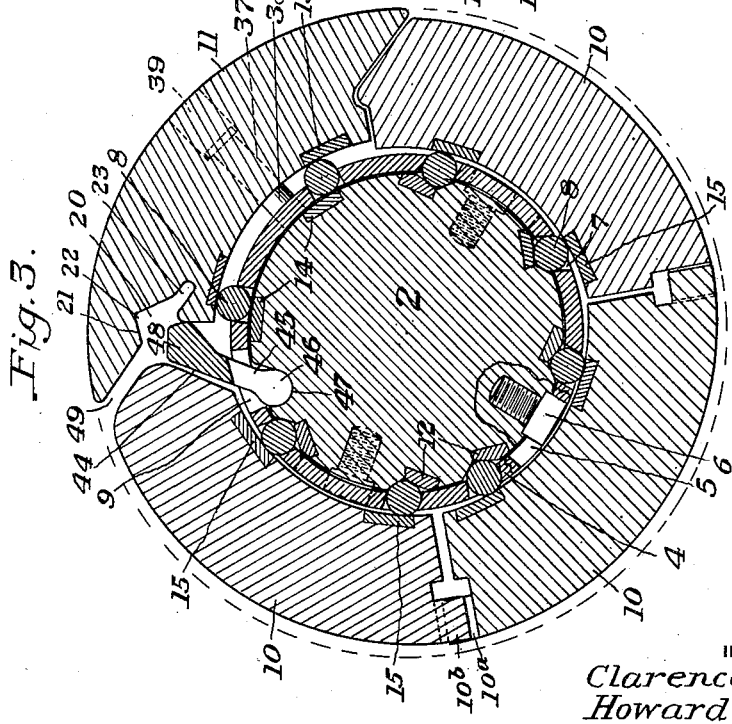
INVENTORS
Clarence J. Klein
Howard H. Talbot

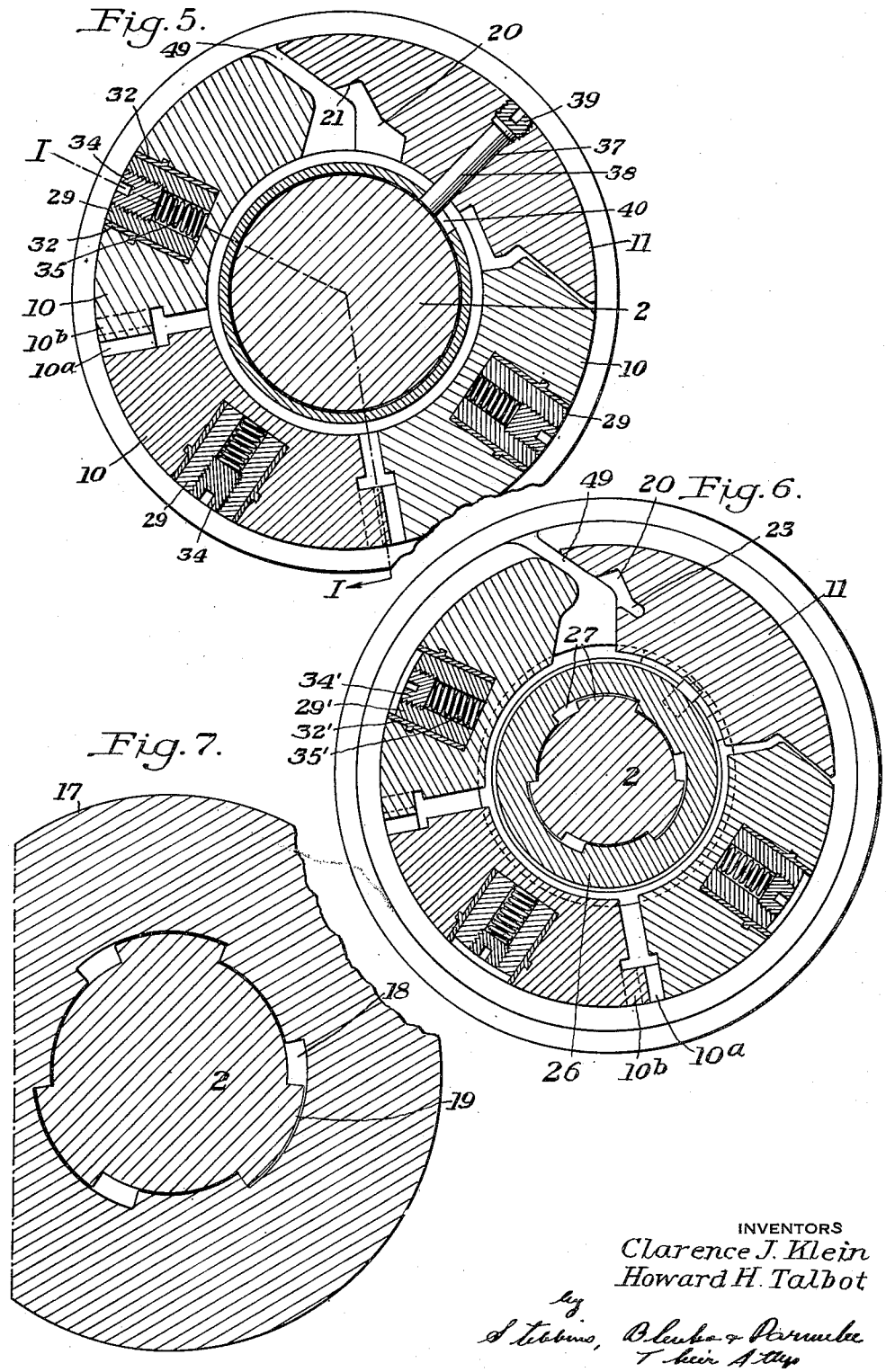

Aug. 13, 1940. C. J. KLEIN ET AL 2,211,472
REEL STRUCTURE
Filed March 2, 1938 6 Sheets-Sheet 4
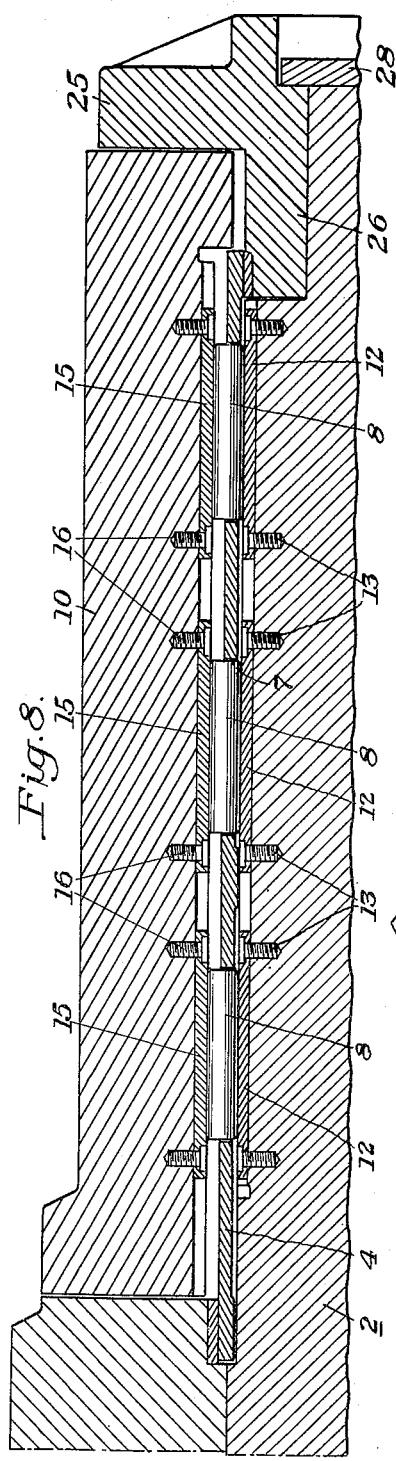
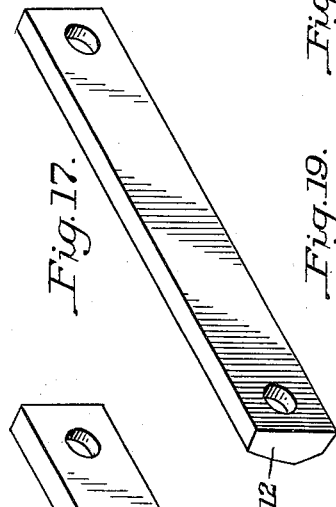
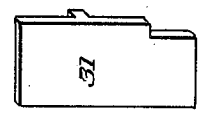
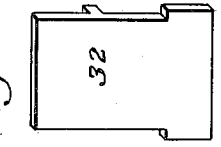
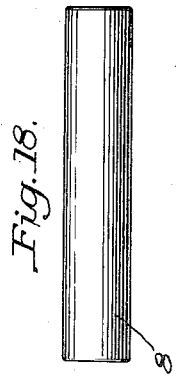
INVENTORS
Clarence J. Klein
Howard H. Talbot
Their Attys.

Aug. 13, 1940.    C. J. KLEIN ET AL    2,211,472
REEL STRUCTURE
Filed March 2, 1938    6 Sheets-Sheet 5

INVENTORS
Clarence J. Klein
Howard H. Talbot

Aug. 13, 1940.      C. J. KLEIN ET AL      2,211,472
REEL STRUCTURE
Filed March 2, 1938      6 Sheets-Sheet 6
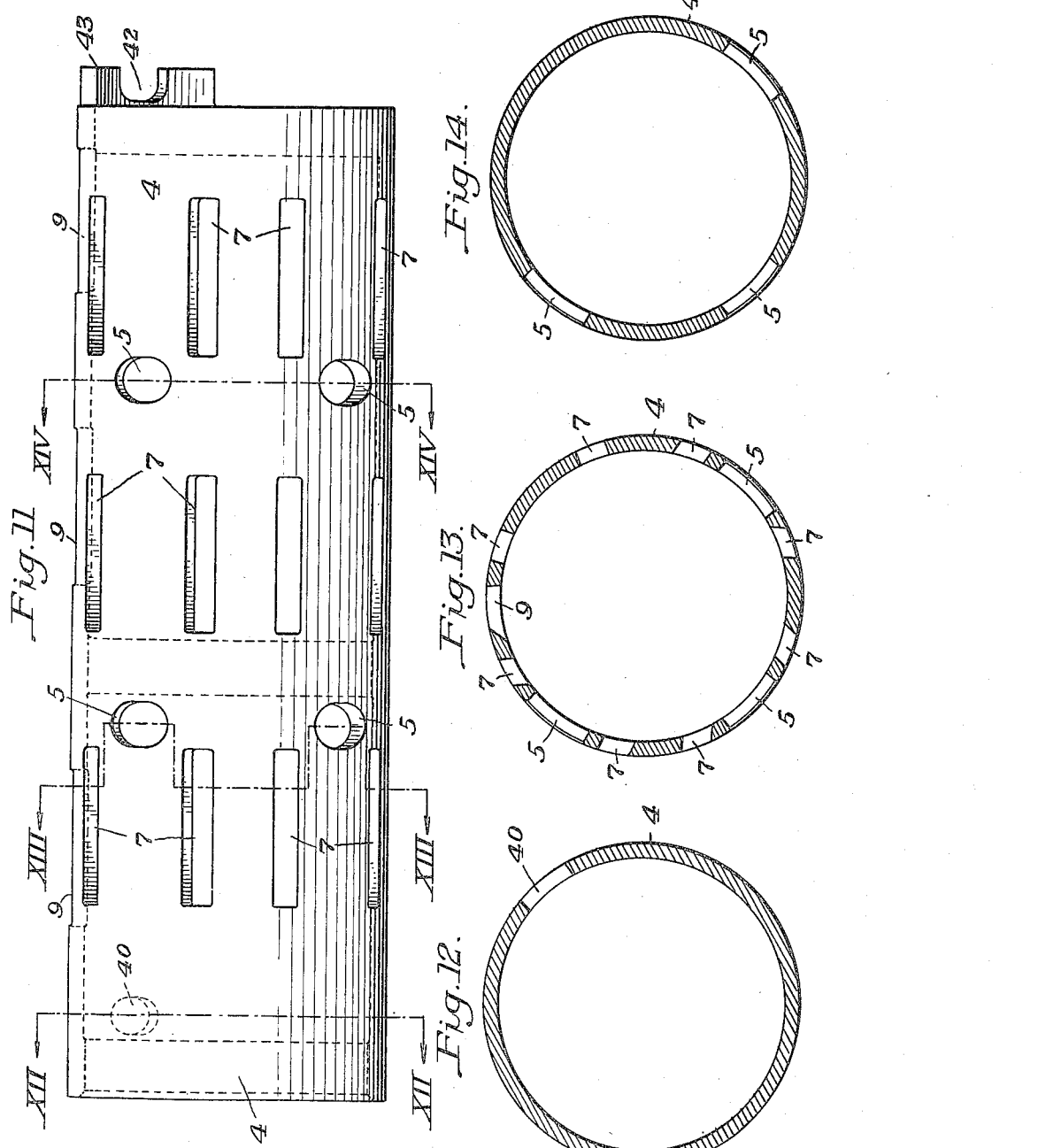
INVENTORS
Clarence J. Klein
Howard H. Talbot Patented Aug. 13, 1940

2,211,472

UNITED STATES PATENT OFFICE 2,211,472

REEL STRUCTURE

Clarence J. Klein, Marland Heights, W. Va., and Howard H. Talbot, Pittsburgh, Pa.

Application March 2, 1938, Serial No. 193,502

24 Claims. (Cl. 242—72)

Our invention relates in general to reel structures and is particularly applicable to improved collapsible reeling apparatus adapted for gripping the end of strip material and effectively coiling the material as the material comes from a mill. The invention is an improvement on the reel described in the application for United States Letters Patent, Serial No. 107,515 for Reel structures filed October 26, 1936 by Clarence J. Klein, one of the applicants. Our invention is peculiarly suitable for use in connection with strip rolling mills and will, therefore, be described as a structure useful for gripping the end of strip metal and coiling the strip metal as it emerges from the mill stand, but it is to be understood that the invention may be satisfactorily employed for gripping and coiling other sheet or strip material.

In the metal strip rolling art, it is customary to deliver strip material from the final or finishing stand of the rolling mill directly to reeling or coiling mechanism, usually called reels or coilers, by means of which the strip is formed into coils. Under present day operative conditions it is customary to produce coils of great weight and frequently it is the practice to exert heavy tension on the material by the reel. The stresses exerted by the reel, for example, in a wide strip cold mill, are of considerable magnitude. It is essential, therefore, that the reel should be as rigidly constructed as possible to withstand great stresses, and the distortion must be kept at a minimum so that the tension may be evenly distributed over the strip as it leaves the last roll stand. This requires that the diameter of the central supporting shaft be as large as possible in comparison with the diameter of the outside or winding surface of the reel. It is also highly desirable that the structure be simple mechanically so that breakdowns may be obviated as much as possible and so that the minimum of time will be consumed when assembling or disassembling the reel, should that be required.

Material so coiled is tightly wound around the drum and it is essential that the reel be of a readily collapsible type to permit the quick release and removal of the finished coil of material. The reel should be of such design that it may be positively and readily expanded and contracted by the operator, and present, when in the contracted or expanded condition, a surface of substantially continuous circular contour so that the finished material will not be unduly marked.

In the reel which is described in the co-pending Clarence J. Klein application, Serial No. 107,515, it is necessary to use some form of winding apparatus, such as a belt wrapper, to wind the end of the strip material on the drum a sufficient number of turns so that no substantial slippage will occur, when the strip is put under tension. This requires added equipment and it is one of the objects of our invention to provide a collapsible reel having a central supporting shaft of as large a diameter as possible in comparison with the diameter of the winding surface, a reel which is readily collapsed and expanded and a reel in which provision is made in the reel itself for gripping means for securing the end of the strip material in position in the reel so that the strip may be wound on the winding surface without the aid of wrapping apparatus auxiliary to the winding reel. The reel which we have invented provides these advantages, is positive in operation and is of such simple construction that it may be assembled and disassembled in a comparatively short time and economically fabricated. Means are provided which are a part of the reel for gripping the end of the strip initially so that the winding of the strip on the reel may be expedited.

The apparatus in general consists of a supporting shaft of as large a diameter as possible in comparison with the diameter of the winding drum, circumferential segments around the supporting shaft, one of which is at a fixed distance from the center of the shaft, and others which are movable radially toward and away from the shaft. Means are provided between the shaft and movable segments for moving those segments outwardly into the winding or expanded condition upon relative rotary movement between the shaft and segments, as well as means for urging the movable segments inwardly. A slot is provided between one of the movable segments and the fixed segment with associated gripping means therein, operative upon relative rotative movement between the fixed segment and the shaft for gripping the end of the material to be coiled.

In the accompanying drawings, there is shown for purposes of illustration only a preferred embodiment of our invention. In the drawings:

Figure 1 is a longitudinal partial section of one form of reel embodying the invention, taken along the line I—I of Figure 5;

Figure 2 is a view along the line II—II of Figure 4;

Figure 3 is a cross-sectional view along the line III—III of Figure 1, but showing the reel in a contracted condition;

Figure 4 is a cross-sectional view of the section shown in Figure 3 but in the expanded position;

Figure 5 is a cross-sectional view through the line V—V of Figure 1;

Figure 6 is a cross-sectional view along the line VI—VI of Figure 1;

Figure 7 is a similar view along the line VII—VII of Figure 1;

Figure 8 is a cross-sectional view along the line VIII—VIII of Figure 4;

Figure 11 is an elevation of a sleeve member;

Figure 12 is a cross-sectional view along the line XII—XII of Figure 11;

Figure 13 is a cross-sectional view along the line XIII—XIII of Figure 11;

Figure 14 is a cross-sectional view along the line XIV—XIV of Figure 11;

Figures 15, 16, 17, 18, 19 and 20 are views showing detail parts of the apparatus.

Figure 10:
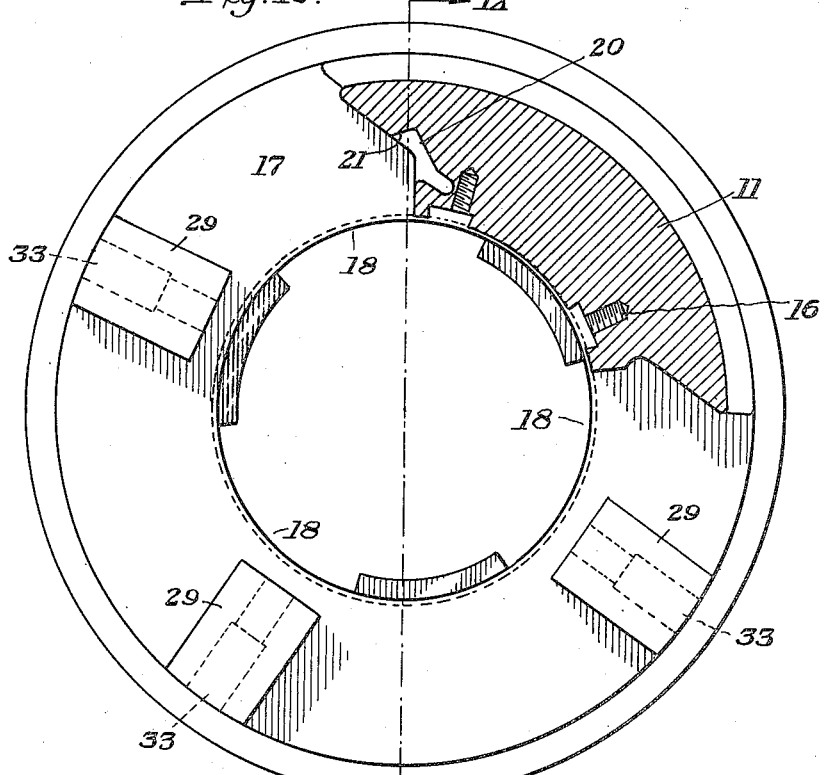
Figure 10 is a cross-sectional view along the line X—X of Figure 9 looking in the direction of the arrows.
Figure 9:
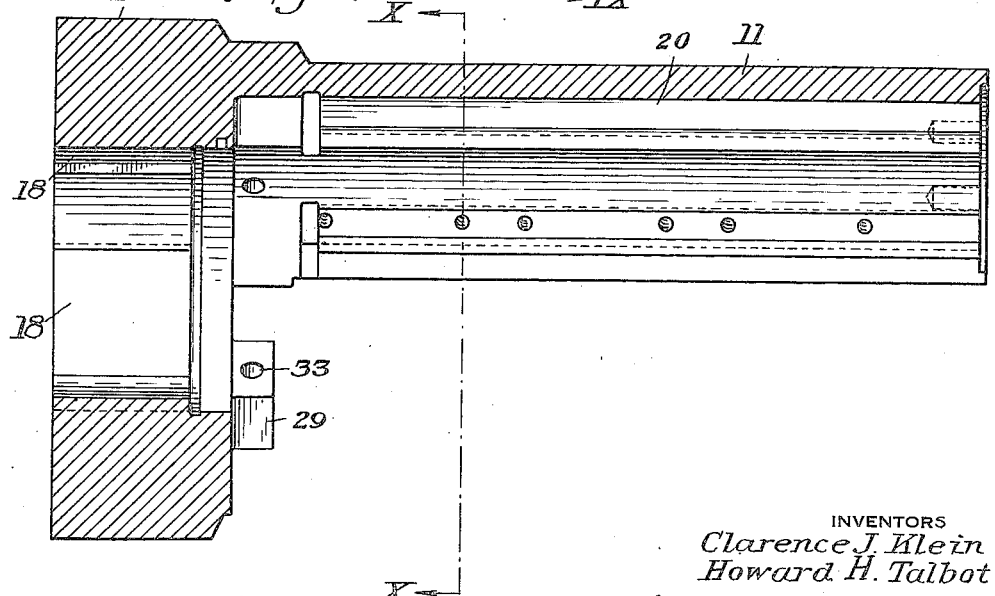
Figure 9 is a longitudinal sectional view of the fixed segment along the line IX—IX of Figure 10.

Referring in detail to the drawings, there is illustrated a reel comprising a central supporting shaft 2 which is of as large a diameter as structurally possible in comparison with the outside diameter of the reel. This will provide a reel of maximum stiffness for a given diameter of the winding surface. The shaft 2 is supported at one end 3 in a manner well known in the art and is driven from that end by any suitable means such as an electric motor, not shown. A retaining sleeve or roller cage 4 is provided to fit around the shaft 2. This sleeve has a number of circumferential slots 5 in each of which is received the head of one of the cap screws 6 which project into threaded holes in the shaft 2. The slots 5 are of such size and shape as to allow limited circumferential or rotary movement of the sleeve 4 about the shaft 2 but no appreciable longitudinal movement (see particularly Figures 1, 3, 4 and 11). The sleeve 4 also has a plurality of longitudinal extending slots 7, three rows of eight each being shown (see Figures 3, 4, 11 and 14). In these slots, rollers 8 are received. There is also provided in the sleeve 4 a discontinuous longitudinal slot 9 through which passes the lower part of a dog 44, later to be described. The rollers 8 are of such dimensions as to fit in the longitudinal slots 7 and are freely rotatable therein.

Surrounding and spaced from the sleeve 4 by rollers 8 is a plurality of annular movable segments 10, three being shown, and a fixed segment 11. The segments 10 are movable toward and away from the central supporting shaft and, when assembled with the fixed segment 11, form a drum which is expansible and contractible. In the expanded position as shown in Figure 4, the movable segments 10, together with the fixed segment 11, forms a circular coiling surface. The edges of segments 10 which abut one another (see Figures 3 and 4) are preferably formed with interfitting portions 10a and 10b. Such edges serve to prevent marking of the strip.

The shaft 2 has a plurality of angularly disposed roller surfaces or races 12 secured in appropriate longitudinal grooves in the surface of the shaft. One preferred arrangement is shown in which there are two longitudinal rows of three each of such angularly disposed races 12 for each of the movable drum segments 10. The surface of these cams are of suitable hard material so as to minimize wear and are secured, as for example by screws 13, to the shaft (see Figure 8). The outside portion of the races 12 are ground cylindrically with and to the same diameter as the shaft 2. Between the fixed segment 11 and the shaft 2, roller surfaces or races 14 are secured in suitable longitudinal grooves in the shaft by means of screws in a manner similar to that described and illustrated in connection with the roller surfaces 12. The outer faces of the races 14 are ground cylindrically with and to the same diameter as the shaft 2.

A plurality of roller surfaces or races 15, two rows of which are shown in each segment, are secured as by screws 16 in suitable longitudinal slots on the inside of the segments 10 and 11 and in position to cooperate with the races 12 and 14 on the shaft 2. The exposed faces of the roller surfaces 15, which are preferably formed from material having a hard surface, are concentric with the shaft 2 when the reel is in the expanded position, (Figure 4). Between each cooperating set of roller surfaces 12 and 15, the rollers 8 are disposed. The roller surfaces 14 and 15 also have rollers 8 therebetween. The roller surfaces 12 and 15, the slots 7 in the sleeve 4 and the rollers 8 are so disposed on the movable segments 10 and the shaft 2 that when the reel is collapsed by relative rotation of the shaft and segments to the condition shown in Figure 3, the various parts assume the position shown in that figure. It will be observed that the surfaces of the races 15 are so disposed with reference to the surfaces of the races 12 that when the shaft is rotated clockwise relative to the drum, or the drum rotated anti-clockwise relative to the shaft 2, the movable segments 10 will assume the position shown in Figure 4, which is the expanded condition of the reel. This is due to the rollers 8 riding up on the inclined faces of roller surfaces 12 and pushing the movable segments 10 outwardly. It will be observed that the arrangement of roller surfaces 14 and 15 is such that relative rotation of the shaft and segments does not increase the circumferential distance from the shaft of the outer surface of movable segment 11. However, the segment 11 will be angularly displaced with reference to the shaft 2 as shown by inspection of Figures 3 and 4. This movement is taken advantage of to move the dog 44, later to be described, into gripping position.

The fixed segment 11 terminates at one end in a driving collar 17 which encircles the shaft 2 near the driven end 3 thereof. The collar 17 has a number of keyways 18 in the inner surface thereof into which projecting lugs 19 of the shaft 2 are received. The keyways 18 and the lugs 19 are of such circumferential length as to allow a certain amount of relative rotative movement between the shaft 2 and the driving collar 17. Formed in the fixed segment 11 is a longitudinal slot 20 having a gripping edge 21, a portion 22 into which the end of a gripping dog 44, is received and a recess 23 extending into the segment 11, (Figures 3, 4, 6 and 10). To the outer end 24 of segment 11 a driving collar 25 is securely fastened, after the segments 10 and 11 and associated apparatus is in place. The driving collar 25 has a cylindrical portion 26 surrounding the outer portion of the shaft 2, and the shaft 2 and the collar 25 have a key and slot connection 27 (see Figure 6), similar to that described in connection with the driving collar 17 and the driving end 3 of the shaft 2. The same amount of limited rotative movement is permitted between the outer collar 25 and the shaft 2 as between the collar 17 and the shaft 2. The collar 25 is restrained from endwise movement relative to the shaft by the plate 28, which is bolted to the shaft.

The movable segments 10 are held in place by connections between the driving collars 17 and 25. The side of the driving collar 17 adjacent the segments 10 has a series of projecting lugs 29, one for each movable segment being shown, which lugs are received into recesses 30 in the ends of the segments 10. Wear plates 31 (see Figure 20) are provided between the outer end of the projection 29 and the inner end of the recess 30, and wear plates 32 are provided between the sides of the projections and the sides of the grooves. These wear plates provide a smooth surface which facilitates sliding movement between the segments 10 and the driving collar 17. Each of the projecting lugs 29 has a hole 33 passing therethrough, the upper end of which is threaded to receive a nut 34. A spring 35 is provided between the bottom of the nut 34 and the bottom 36 of the recess 30 of the segment 10. By turning screw 34, the tension of spring 35 may be varied. This spring, when compressed, tends to force the segments 10 inwardly, and when the roller cage is in the position shown in Figure 3, the segments are positively forced into the position shown in Figure 3. A similar arrangement is shown at the outer or unsupported end of the reel, a section of which is shown in Figure 6. The same numerals with a suffix affixed thereto denote similar parts.

The fixed segment 11 has extending through the end 11a thereof, which is the portion disposed toward the supported end of the shaft (see Figure 2), a hole 37 in which is received a pin 38 which pin is secured in the hole by the threaded plug 39. This pin projects into and is received in a slot 40 near the left-hand end of the roller cage 4 (see Figures 2 and 5). From the portion 26 of the collar 25 a pin 41 projects outwardly into a slot 42 formed in projection 43 of sleeve or roller cage 4 (see Figure 11). The slots 40 and 42 are of such a size relative to pins 38 and 41 respectively, that the same amount of relative rotary movement is permitted between the fixed segment 11 and sleeve 4. The pins 38 and 41 insure that the cage 4 will be positively moved upon relative rotation between the fixed segment 11 and the shaft 2. By this arrangement the roller cage 4 will be moved when there is a certain amount of relative rotary movement between the shaft 2 and the segments which, in turn, will compel the rollers 8 to move and insure operation of the reel.

The discontinuous slot 9 in the sleeve 4 is so disposed that when the sleeve is assembled on the shaft, the slot 9 is in the position shown in Figure 3. Passing through this slot is a dog or gripping member 44 (see Figures 2, 3 and 4) having projections 45 which terminate in circular portions 46. The circular portions 46 are rotatably received in a hollowed out portion 47 of shaft 2. The dog 44 has an outwardly projecting portion 48 which is shaped and sized as to cooperate with the longitudinal slot 20 in fixed segment 11 so that when the reel is in the expanded position shown in Figure 4, the end 48 will be so disposed with reference to the sides of the slot 20 as to firmly engage the end of the strip which has been inserted in the slot. In Figure 3, the dog 44 is shown in the retracted or non-gripping position. While the dog is in this position, the end of the sheet to be wound is readily inserted in the space 49 between the fixed segment 11 and the adjoining movable segment 10. This space 49 is a continuation of slot 20.

At the beginning of the winding operation, the end of the strip to be wound is inserted through the space 49 into the slot 20, the reel then being in the contracted position shown in Figure 3. The reel is then expanded by rotating the shaft 2 clockwise with respect to the segments, whereupon the movable segments 10 will move outwardly in a radial line by the action of the rollers and races already described, and the dog 44 will move into the gripping position shown in Figure 4 by the movement of the segment 11 relative to the dog 44. The reel then is rotated clockwise to wind the material thereon.

When the winding has been completed, the reel will be collapsed by reversing the movement already described. This is frequently done by arresting the movement of the shaft and allowing the drum to turn clockwise relative to the shaft. The various parts will assume the position shown in Figure 3, which is the collapsed condition. The segments 10 are forced inwardly due to the force of the springs 35 exerted against the bottom 36 of the recesses 30 of the segments 10, and this movement may be assisted by the weight of the coil.

The reel structure made according to our invention has a supporting shaft of maximum rigidity for a given reel diameter and is of the largest possible diameter in comparison with the diameter of the winding drum. This is due to the fact that the expanding mechanism takes up but little space and is of simple design, positive in operation and of great strength. The reel can be readily assembled and disassembled in a very short time if such be necessary. The means for gripping the end of the strip to be wound is positive in operation and sturdy. The reel is inexpensive to construct and provides a very satisfactory winding surface.

We have described a preferred embodiment of our reel which is of the type in common use in the strip metal rolling industry and which is supported only at one end thereof, the supporting shaft acting as a cantilever beam. Our invention can also be applied to a reel which may be supported at both ends, in which case a bearing would be provided at what is now the unsupported end. Such bearings are well known in the art.

While we have illustrated and described a preferred embodiment of our invention, it will be understood that changes in the construction, operation and relationship of the parts may be made without departing from the spirit of our invention or the scope of the following claims.

We claim:

1. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft and having means therebetween for causing radial displacement of the movable segments with respect to the shaft upon relative rotation of the shaft, a fixed segment a portion of which encircles the shaft and a driving connection between the shaft and the encircling portion of the fixed segment permitting only a limited arcuate movement between the shaft and the fixed segment in either direction.

2. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft and having means therebetween for causing radial displacement of the movable segments with respect to the shaft upon relative rotation of the shaft, a fixed segment a portion of which encircles the shaft, a driving connection between the shaft and the encircling portion of the fixed segment permitting only a limited arcuate movement between the shaft and the fixed segment in either direction and means for gripping the material to be wound.

3. In a reel structure for coiling strip material, a supporting shaft, an expansible drum comprising movable segments and a fixed segment, said fixed segment having a portion at one end thereof extending beyond the drum which encircles the shaft, a driving connection between said shaft and encircling portion of the fixed segment permitting only a limited arcuate movement between the shaft and the encircling portion in either direction, a driving connection between the fixed segment and the movable segments, drum-expanding means between the shaft and drum for causing the movable segments to move so that all points on the circumference of the movable segments are moved in substantially equal amounts relative to the center line of the shaft and in a plane at right angles to the longitudinal axis of the shaft and drum-contracting means between the fixed segment and the movable segments.

4. In a reel structure for coiling strip material, a supporting shaft, an expansible drum comprising movable segments and a fixed segment, said fixed segment having a portion at one end thereof extending beyond the drum which encircles the shaft, a driving connection between said shaft and encircling portion of the fixed segment permitting only a limited arcuate movement between the shaft and the encircling portion in either direction, a direct driving connection between the fixed segment and the movable segments, drum-expanding means between the shaft and drum for causing the movable segments to move so that all points on the circumference of the movable segments are moved in substantially equal amounts relative to the center line of the shaft and in a plane at right angles to the longitudinal axis of the shaft and means one end of which is journaled in the shaft and operable upon relative rotation between the shaft and drum for gripping the material to be wound.

5. In a reel structure for coiling strip material, a fixed segment and a movable segment forming a winding drum, a supporting shaft, a driving collar at each end of the drum, rigidly secured to the fixed segment and permitting only a limited arcuate movement between the shaft and the drum, roller surfaces on the drum, roller surfaces on the shaft, rollers between said surfaces, a roller cage for maintaining said rollers in spaced apart relation, and means for causing rotation of the roller cage upon relative rotative movement between the shaft and the drum.

6. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft, rollers between said surfaces, a roller cage for maintaining said rollers in spaced apart relation, a fixed segment a portion of which encircles the shaft, and a driving connection between the shaft and the encircling portion of the fixed segment permitting only a limited arcuate movement between the shaft and the fixed segment in either direction.

7. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft, rollers between said surfaces, a roller cage for maintaining said rollers in spaced apart relation, a fixed segment a portion of which encircles the shaft, and means on the fixed segment for causing rotation of the roller cage upon relative rotative movement between the shaft and the fixed segment.

8. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft, rollers between said surfaces, a roller cage for maintaining said rollers in spaced apart relation, a fixed segment a portion of which encircles the shaft, a driving connection between the shaft and the encircling portion of the fixed segment permitting only a limited arcuate movement between the shaft and the fixed segment in either direction, and means actuated by arcuate movement between the shaft and the fixed segment for gripping the material to be wound.

9. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft, rollers between said surfaces, a roller cage for maintaining said rollers in spaced apart relation, a fixed segment a portion of which encircles the shaft, means on the fixed segment for causing rotation of the roller cage upon relative rotative movement between the shaft and the fixed segment, and means actuated by arcuate movement between the shaft and the fixed segment for gripping the end of the material to be wound.

10. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft, rollers between said surfaces, a roller cage for maintaining said rollers in spaced apart relation, a fixed segment a portion of which encircles the shaft, a driving connection between the shaft and the encircling portion of the fixed segment permitting only a limited arcuate movement between the shaft and the fixed segment in either direction, and means between the fixed segments and the movable segment for driving the movable segments.

11. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft, rollers between said surfaces, a roller cage for maintaining said rollers in spaced apart relation, a fixed segment a portion of which encircles the shaft, a driving connection between the shaft and the encircling portion of the fixed segment permitting only a limited arcuate movement between the shaft and the fixed segment in either direction, and means between the fixed segments and the movable segments for urging the movable segments inwardly.

12. In a reel structure for coiling strip material, a supporting shaft, an expansible drum arranged around the shaft and comprising a fixed segment and movable segments, rollers between the drum and shaft, means concentric with the shaft and effective upon limited relative rotation of the drum and shaft for effecting radial movement of the rollers for moving the movable segments outwardly so that all points on the circumference of the movable segments are moved in substantially the same amount relative to the center line of the shaft and at right angles to the longitudinal axis of the shaft and thus enlarging the diameter of the drum, means connecting the fixed segment and the shaft and permitting such limited relative rotation of the drum, and means between the fixed segment and the movable segment for driving the movable segments.

13. In a reel structure for coiling strip material, a supporting shaft, an expansible drum arranged around the shaft and comprising a fixed segment and movable segments, rollers between the drum and shaft, means concentric with the shaft and effective upon limited relative rotation of the drum and shaft for effecting radial movement of the rollers for moving the movable segments outwardly so that all points on the circumference of the movable segments are moved in substantially the same amount relative to the center line of the shaft and at right angles to the longitudinal axis of the shaft and thus enlarging the diameter of the drum, means connecting the fixed segment and the shaft and permitting such limited relative rotation of the drum, means between the fixed segment and the movable segment for driving the movable segments, and means actuated by arcuate movement between the drum and the shaft for gripping the material to be wound.

14. In a reel structure for coiling strip material, a shaft, a drum encircling the shaft comprised of radially movable segments and a fixed segment, said fixed segment having a collar at each end keyed to the shaft through a lost motion connection, means connecting the fixed segment and the movable segments and allowing radial movement of the movable segments for driving the movable segments, and means disposed between the shaft and the movable segments for causing the movable segments to be moved radially outwardly upon relative rotation of the shaft and drum so that all points on the circumference of the movable segments are moved in substantially equal amounts relative to the center line of the shaft and in a plane at right angles to the longitudinal axis of the shaft.

15. In a reel structure for coiling strip material, a shaft, a drum encircling the shaft comprised of radially movable segments and a fixed segment, said fixed segment having a collar on one end encircling the shaft and keyed to the shaft through a lost motion connection, and means for causing radial movement of the movable segments upon relative rotation of the shaft and the fixed segment so that all points on the circumference of the movable segments are moved in substantially equal amounts relative to the center line of the shaft and in a plane at right angles to the longitudinal axis of the shaft.

16. In a reel structure for coiling strip material, a fixed segment and a movable segment forming a winding drum, a supporting shaft, a driving collar at each end of the drum, rigidly secured to the fixed segment and permitting only a limited arcuate movement between the shaft and the drum, means between the shaft and the movable segment for urging the movable segment outwardly, and means actuated by arcuate movement between the shaft and the drum for gripping the material, said gripping means comprising a dog one end of which cooperates with the side of a slot in the fixed segment and the other end of which is journalled in the shaft, the dog being moved into gripping position by contact with the fixed segment upon relative arcuate movement between the fixed segment and the shaft.

17. An automatically collapsible reel for pulling and coiling strip under tension, including a supporting shaft, an expansible drum journaled for slight relative rotary movement around the shaft, said drum comprising a radially fixed segment and radially movable segments, a sleeve having openings therethrough concentrically arranged about said shaft between the shaft and the drum, rollers extending between the drum and the shaft and through said openings in the sleeve and movable by rotation of the sleeve, means on the movable segments and on the shaft for causing outwardly substantial radial movement of the movable segments upon rotation of the sleeve, a driving collar on the shaft connected to the fixed segment, a lost motion connection between the driving collar and the shaft permitting limited relative arcuate movement between the shaft and the collar, and means between the collar and the movable segments for driving the movable segments.

18. An automatically collapsible reel for pulling and coiling strip under tension, including a supporting shaft, an expansible drum journaled for slight relative rotary movement around the shaft, said drum comprising a radially fixed segment and radially movable segments, a sleeve having openings therethrough concentrically arranged about said shaft between the shaft and the drum, rollers extending between the drum and the shaft and through said openings in the sleeve and movable by rotation of the sleeve, means on the movable segments and on the shaft for causing outwardly substantial radial movement of the movable segments upon rotation of the sleeve, a driving collar on the shaft connected to the fixed segment, a lost motion connection between the driving collar and the shaft permitting limited relative arcuate movement between the shaft and the collar, means between the collar and the movable segments for driving the movable segments, and means actuated by arcuate movement between the shaft and the fixed segment for gripping the material to be wound.

19. In a reel structure for coiling strip material, the combination of a supporting shaft, a plurality of segments some of which are movable with respect to another disposed about said shaft, roller surfaces on the segments, roller surfaces on the shaft, the surfaces on the movable segments being angularly disposed with respect to the surfaces on the shaft, rollers between said surfaces, a roller cage for maintaining said rollers in spaced apart relation, a fixed segment a portion of which encircles the shaft, a driving connection between the shaft and the encircling portion of the fixed segment permitting only a limited arcuate movement between the shaft and the fixed segment in either direction, means between the fixed segment and the movable segments for urging the movable segments inwardly, and means actuated by arcuate movement between the shaft and the drum for gripping the end of the material to be wound.

20. A reel comprising a central supporting shaft, two spaced apart collars mounted against longitudinal movement along the shaft and connected to the shaft by a lost motion connection which allows limited relative rotation at each end of said shaft, a fixed segment secured to and connecting said collars, movable segments connected at each end to the collars so as to be slidable radially so that all points on the circumference of the movable segments will at all positions thereof be substantially equi-distant from the center line of the shaft, said fixed segment and the movable segments being disposed around the shaft so as to form a drum, and means interposed between the movable segments and the shaft and intermediate said collars to cause the movable segments to move outwardly upon relative rotative movement between the shaft and the collars.

21. A reel comprising a central supporting shaft, two spaced apart collars mounted against longitudinal movement along the shaft and connected to the shaft by a lost motion connection which allows limited relative rotation at each end of said shaft, a fixed segment secured to and connecting said collars, movable segments connected at each end to the collars so as to be slidable radially so that all points on the circumference of the movable segment will at all positions thereof be substantially equi-distant from the center line of the shaft, means interposed between the movable segments and the shaft and intermediate said collars to cause the movable segments to move outwardly upon relative rotative movement between the shaft and the collars, and means between the collars and the movable segments for urging the movable segments inwardly.

22. A reel comprising a central supporting shaft, two spaced apart collars mounted against longitudinal movement along the shaft and connected to the shaft by a lost motion connection which allows limited relative rotation at each end of said shaft, a fixed segment secured to and extending between said collars, movable segments connected at each end to the collars so as to be slidable radially so that all points on the circumference of the movable segments will at all positions thereof be substantially equi-distant from the center line of the shaft, means interposed between the movable segments and the shaft and intermediate said collars to cause the movable segments to move outwardly upon relative rotative movement between the shaft and the collars, resilient means between the collars and the movable segments for urging the movable segments inwardly, and means journaled in the shaft and actuated by relative rotative movement between the shaft and the collars for gripping the material to be wound.

23. In a reel structure for coiling strip material, a shaft, a drum encircling the shaft comprised of radially movable segments and a fixed segment, each of said movable segments being so disposed that all points on the circumference thereof are moved in substantially equal amounts relative to the center line of the shaft and in a plane at right angles to the longitudinal axis of the shaft, said fixed segment having a collar at each end keyed to the shaft through a lost motion connection permitting limited arcuate motion between the collar and the shaft, and resilient means interposed between the driving collars and the movable segments for urging the movable segments inwardly.

24. In a reel structure for coiling strip material, a shaft, a drum encircling the shaft comprised of radially movable segments and a fixed segment, each of said movable segments being so disposed that all points on the circumference thereof are moved in substantially equal amounts relative to the center line of the shaft and in a plane at right angles to the longitudinal axis of the shaft, said fixed segment having a collar on one end encircling the shaft and keyed to the shaft through a lost motion connection, means between the movable segments and the shaft and operable upon relative rotation between the shaft and the drum for moving the segments radially outwardly, resilient means between the movable segments and the collar for urging the movable segments radially toward the center of the shaft, and means journaled in the shaft and operated by movement of the fixed segment relative to the shaft for gripping the material to be coiled.

CLARENCE J. KLEIN.
HOWARD H. TALBOT.